(12) United States Patent
Hodac

(10) Patent No.: US 9,389,070 B2
(45) Date of Patent: Jul. 12, 2016

(54) MONITORING DEVICE, SYSTEM AND METHOD FOR THE MONITORING OF AN AREA OF BUILDING OR LAND, USING AT LEAST ONE LIGHT WAVEGUIDE

(75) Inventor: Bernard Hodac, Paris (FR)

(73) Assignee: OSMOS SA, Courbevoie (FR)

( * ) Notice: Subject to any disclaimer, the term of this patent is extended or adjusted under 35 U.S.C. 154(b) by 0 days.

(21) Appl. No.: 14/376,918

(22) PCT Filed: Feb. 9, 2012

(86) PCT No.: PCT/IB2012/000732
§ 371 (c)(1),
(2), (4) Date: Aug. 6, 2014

(87) PCT Pub. No.: WO2013/117954
PCT Pub. Date: Aug. 15, 2013

(65) Prior Publication Data
US 2015/0009511 A1    Jan. 8, 2015

(51) Int. Cl.
*G01B 11/16* (2006.01)
*G01B 11/28* (2006.01)
*G01M 11/08* (2006.01)

(52) U.S. Cl.
CPC ............... *G01B 11/28* (2013.01); *G01B 11/16* (2013.01); *G01M 11/083* (2013.01)

(58) Field of Classification Search
CPC .................. G02B 2006/12107; G02B 6/12007; G02B 2006/12176; G02B 6/132; G02B 6/02085; G02B 6/305; G02B 6/29317; G02B 6/4206; G02B 6/4246
See application file for complete search history.

(56) References Cited

U.S. PATENT DOCUMENTS

| 5,044,205 | A | 9/1991 | Wolff et al. |
| 5,594,239 | A | 1/1997 | Lessing |
| 6,332,365 | B1 | 12/2001 | Hodac |
| 6,816,638 | B1* | 11/2004 | Bennion et al. ................ 385/13 |
| 8,636,063 | B2* | 1/2014 | Ravi et al. ................... 166/253.1 |
| 2005/0232532 | A1* | 10/2005 | Wang et al. .................... 385/13 |
| 2005/0241403 | A1* | 11/2005 | Thomson et al. ............... 73/773 |
| 2006/0137914 | A1 | 6/2006 | Hodac |
| 2011/0199607 | A1 | 8/2011 | Kanellopoulos et al. |
| 2011/0216996 | A1* | 9/2011 | Rogers ............................ 385/12 |

FOREIGN PATENT DOCUMENTS

| WO | 03008903 | 1/2003 |
| WO | 2008054339 | 5/2008 |

\* cited by examiner

*Primary Examiner* — Michael P Stafira
(74) *Attorney, Agent, or Firm* — Greer, Burns & Crain, Ltd.

(57) ABSTRACT

A monitoring device is provided that is used for the monitoring of an area of building or land, including an optical strand used as a sensor, one optical source for emitting an optical emission signal transmitted in the optical strand, and one optical analogue detector for detecting an intensity of an optical return signal corresponding to the optical emission signal returning from the optical strand. The monitoring device is arranged as a compact unit and includes a controller for alternately activating and deactivating the emission of the optical source so that a ratio between the non-emission duration and the emission duration is greater than 5000. A monitoring system is also provided including such a monitoring device, and a monitoring method carried out in the monitoring device.

13 Claims, 3 Drawing Sheets

MONITORING DEVICE, SYSTEM AND METHOD FOR THE MONITORING OF AN AREA OF BUILDING OR LAND, USING AT LEAST ONE LIGHT WAVEGUIDE

BACKGROUND

The present invention relates to a monitoring device used for the monitoring of an area of building or land.

Such a monitoring device comprises at least one light waveguide used as a sensor.

The present invention also relates to:
a monitoring system comprising such a monitoring device, and
a related monitoring method.

The technical field of the invention concerns more specifically the field of the monitoring of deformation of building structures.

It is known in the prior art a monitoring device used for the monitoring of an area of building or land, and comprising
an optical strand used as a sensor, placed in or on an area to monitor, consisting in a component as described in document EP 0 264 622 B1, with optical waveguides that are prestressed to such an extend that they are subjected to tensile stress even when subjected to little deformation.
one optical source for emitting an optical emission signal transmitted in the optical strand;
one optical analogue detector for detecting monitoring data comprising an intensity of an optical return signal corresponding to the optical emission signal returning from the optical strand; and
processing means for calculating a deformation of the monitored area from the detected monitored data.

The optical strand is described in details in documents EP 0 264 622 B1 and U.S. Pat. No. 5,044,205. Said document concerns indeed a component with optical waveguides which serve to monitor the deformations of the component and are fastened on or in the component under mechanical prestress, the optical waveguides being firmly bounded to the component over at least part of its length and being prestressed to such an extent that they are subjected to tensile stress even when deformations due to compression, shrinkage or creep occur in the component.

Also from EP 0 264 622 B1, the man skilled in the art knows a method for the monitoring of deformation of a building structure with the optical strand. The optical strand is connected to a measuring apparatus. The forces applied on the optical strand have the effect of dampening light sent through the optical strand in a manner which varies according to the intensity of these forces. By detecting the attenuation of the light, a measurement of the elongation of the optical strand with respect to his nominal length is obtained indirectly from a characteristic curve. Said elongation can be related to a deformation of the monitored building structure.

According to the prior art, the optical source, the optical analogue detector and the processing means are placed in a remote station connected with said optical strand using optical fibers.

A drawback of such a monitoring device is that it can be expensive.

Another drawback of such a monitoring device is that it can be fragile.

SUMMARY

An objective of the present invention is to propose a monitoring device that is more robust than the monitoring device according to the prior art.

Another objective of the present invention is to propose a monitoring device that is less expensive than the monitoring device according to the prior art.

Another objective of the present invention is to propose a monitoring system comprising such a monitoring device.

Another objective of the invention is to propose a monitoring method carried out in such a monitoring device.

At least one of the above-mentioned objectives is achieved with a monitoring device used for the monitoring of an area of building or land by detecting monitoring data relating to an optical signal after a round trip in an optical strand, comprising:
an optical strand used as a sensor, comprising optical waveguides under mechanical prestress to such an extend that they are subjected to tensile stress even when subjected to little deformation;
one optical source for emitting an optical emission signal transmitted in the optical strand;
one optical analogue detector for detecting monitoring data comprising an intensity of an optical return signal corresponding to the optical emission signal returning from the optical strand.

The monitoring device according to the invention is arranged as a compact unit and comprises control means for alternately activating and deactivating the emission of the optical source so that a ratio between the non-emission duration and the emission duration is greater than 5000.

Said optical strand can consist in particular in a component with optical waveguides which serve to monitor the deformations of the component and are fastened on or in the component under mechanical prestress, the optical waveguides being firmly bounded to the component over at least part of its length and being prestressed to such an extent that they are subjected to tensile stress even when deformations due to compression, shrinkage or creep occur in the component.

By detecting the attenuation of the light intensity, a measurement of the elongation of the optical strand with respect to his nominal length can be obtained. Said elongation can be related to a deformation of the monitored area of building or land.

The control means can be arranged for automatically controlling the emission and non-emission of the optical source.

The monitoring device according to the invention is used for the monitoring of deformation of an area of a building or land, by detecting an attenuation of the optical return signal intensity.

The control means for alternately activating and deactivating the emission of the optical source can create a rectangular signal.

An idea according to the invention is to think about having a ratio between the non-emission duration and the emission duration that is greater than 5000.

Such a ratio between the non-emission duration and the emission duration is sufficient only because the monitoring device uses an optical strand and intensity detection in order to monitor an area. Indeed, the damping of light can be immediately obtained, even with a very short period of activation of the optical source.

It would not be possible with other methods of measurement that are commonly used in the state of art. Such methods are for instance interferometry. Such methods need long emission durations, preferably a continuous emission signal, as they require long signal treatments.

Such a ratio could not be used with any other device and method. The time duration to determine a deformation of a monitored area is much shorter using an optical strand and intensity detection than using other methods and devices, for a given processing capacity.

The huge ratio between the non-emission duration and the emission duration makes it possible to significantly reduce to energy consumption of the monitoring device according to the invention.

The costs associated to the monitoring device according to the invention can be significantly reduced, by reducing the costs for its power supply.

Moreover, the optical source can be connected to energy storage means with little energy storage capacity. Such energy storage means can be a solar cell, a battery like a nickel-cadmium battery, etc.

Such energy storage means with little energy storage capacity can be installed directly in the monitoring device arranged as a compact unit, preferably on one piece.

It makes it possible to arrange the monitoring device as a compact unit, without any physical connection with any other remote station.

Therefore, the monitoring device is more robust, as there are no physical connections that could be easily broken.

The monitoring device being arranged as a unit, in one piece, it is easier to install. Moreover it requires less material (no wire connections with a remote station). Consequently, the production costs are reduced.

Advantageously, the monitoring device according to the invention comprises control means for alternately activating and deactivating the detection by the optical analogue detector.

The periods of detection activation corresponds advantageously to periods of reception, by said detector, of the optical return signal.

This enables to reduce the energy consumption of the monitoring device according to the invention, by reducing the energy consumption of the optical analogue detector that is not continuously activated.

In a preferred embodiment of the invention, the optical source emission and the detection activation are simultaneously.

The period of detection activation can be longer than the period of emission activation, for a same starting moment. This enables to take into account the delays due to the electronics (and the duration between light emission and light reception). For instance, the duration of emission activation is 1 µs whereas to duration of detection activation is 200 µs.

The optical source emission and the detection activation can also be shifted in order to take into account such delays.

The control means for alternately activating and deactivating the emission of the optical source can be arranged to periodically activate the emission of the optical source one microsecond per time period, said time period being between approximately 5 and 100 milliseconds.

Consequently, the energy consumption is reduced.

It corresponds to a frequency between approximately 10 and 200 Hz. One can remark that an analogue detection, using such a time period, corresponds to a digital detection at a scanning frequency between approximately 10 and 200 Hz corresponding to the scanning frequencies in the prior art.

More particularly, the control means for alternately activating and deactivating the emission of the optical source can be arranged to periodically activate the emission of optical source one microsecond per time period, said time period being between approximately 5 and 30 milliseconds, more particularly between approximately 10 and 20 milliseconds.

It corresponds to a frequency between approximately 33 and 200 Hz, respectively between approximately 50 and 100 Hz. One can remark that the analogue detection, using such a time period corresponds to a digital detection at a scanning frequency between approximately 33 and 200 Hz, respectively between approximately 50 and 100 Hz, corresponding more particularly to the scanning frequencies in the prior art.

The monitoring device according to the invention can comprise processing means to calculate, from the intensity of the optical return signal, monitoring data comprising a change in the length of the optical strand.

The monitoring device can comprise memory means in order to store monitoring data. Said monitoring data can comprise for instance:
  a change in the length of the optical strand, or
  an intensity of an optical return signal returning from the optical strand.

Thereby, it is not necessary to have a continuous data exchange between the monitoring device and any remote station that can for instance compile the monitoring data over time and/or analyze the data in order to conclude about the mechanical state of the monitored area.

The monitoring device according to the invention can further comprise an electrical connector for transferring data and/or energy. Such electrical connector for transferring data and/or energy can be miniaturized in order to have a miniaturized monitoring device. Such electrical connectors are less voluminous than optical fibers, enabling a much more compact installation.

Such an electrical connector can be a bus, i.e. a subsystem that transfers data between computers, the monitoring device being considered as one of said computers.

The electrical connector for transferring data and/or energy can be used for the monitoring device to receive data and/or energy from a remote base.

In a preferred embodiment of the invention, the monitoring device further comprises wireless transmission means for transmitting monitoring data to a remote station.

The wireless transmission means make it possible for the monitoring device to be completely free of connection unlike conventional solutions. There is no restrictive wire link between the monitoring device and any other remote device.

The invention also concerns a monitoring system, comprising a monitoring device according to the invention and a remote station (50; 50'; 50").

In the monitoring system according to the invention:
  the monitoring device comprises wireless transmission means for transmitting monitoring data to said remote station; and
  the remote station comprises processing means for calculating, from an intensity variation of the optical return signal, monitoring data comprising a change in the length of the optical strand.

The monitoring data transmitted to said remote station can comprise an intensity variation of the optical return signal.

As the calculation of a change in the length of the optical strand is carried out in the remote station, there is no energy consumption for said processing in the monitoring device according to the invention. It makes it possible to further reduce the energy consumption of a monitoring device according to the invention.

The monitoring system according to the invention can comprise several monitoring devices according to the invention, each comprising wireless transmission means for transmitting monitoring data to a same remote station.

The remote station can receive data from several monitoring devices without any accumulation of wires from said several monitoring devices.

The remote station can comprise means for a user to activate said transmission of monitoring data (from the monitoring device to the remote station).

In a variant of this embodiment, the remote station can comprise means for controlling a period of transmission of monitoring data (from the monitoring device to the remote station).

In another variant of this embodiment, the monitoring device can be arranged for transmitting monitoring data at a predetermined period.

Those variants can be combined.

The invention also concerns a method of monitoring an area of building or land, carried out in a monitoring device according to the invention.

The method according to the invention comprises the steps of:
- alternately activating and deactivating the emission of the optical source, so that a ratio between the non-emission duration and the emission duration is greater than 5000; and
- detecting monitoring data comprising an intensity of an optical return signal corresponding to the optical emission signal returning from the optical strand.

By detecting the attenuation of the light intensity, a measurement of the elongation of the optical strand with respect to his nominal length can be obtained. Said elongation can be related to a deformation of the monitored area of building or land.

The technical effects and advantages mentioned about the monitoring is device according to the invention also concern the method according to the invention.

In a preferred embodiment, the detection of monitoring data is carried out only during time periods corresponding to:
- the periods of reception of the optical return signal, by the monitoring device,
- which are added the delays due to the electronics.

The method can further comprise a step of calculating, from the intensity of the optical return signal, monitoring data comprising a change in the length of the optical strand.

Said calculation is advantageously carried out in a remote station.

The method can further comprise a step of transmitting monitoring data from the monitoring device to a remote station.

Said monitoring data can comprise for instance:
- a change in the length of the optical strand, or
- an intensity of an optical return signal returning from the optical strand.

In one variant of the invention, said transmission step is periodically carried out.

In another variant of the invention, said transmission step is carried out on demand.

Both variants can be combined.

BRIEF DESCRIPTION OF THE DRAWINGS

Other advantages and characteristics of the invention will become apparent on examining the detailed description of an embodiment which is in no way limitative, and the attached drawings, in which.

DETAILED DESCRIPTION

Even though the figures show the monitoring device and system according to the invention, the following description can also illustrate the monitoring method according to the invention which is carried out in a monitoring device and/or system according to the invention.

Figure 1:
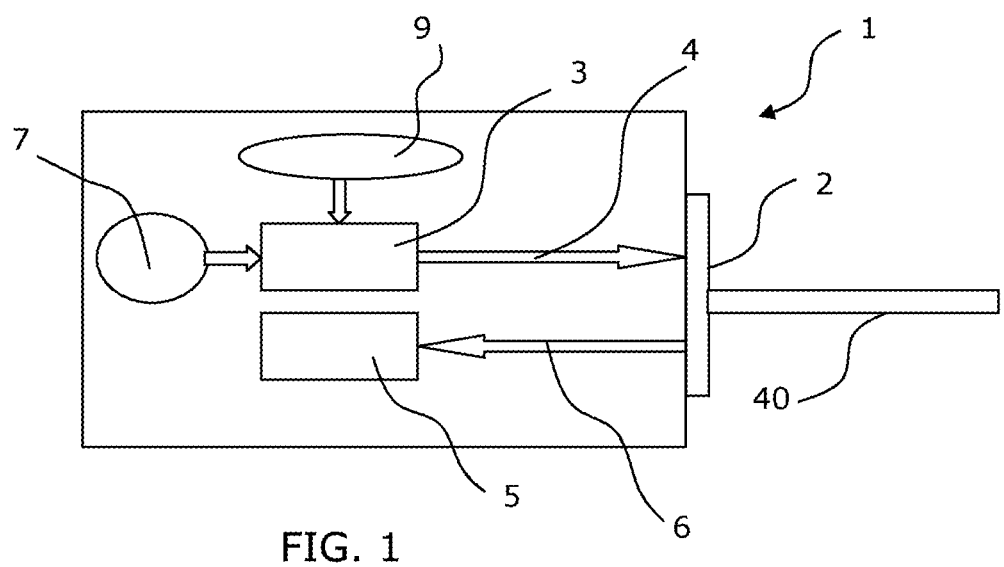
FIG. 1 is a first embodiment of a monitoring device according to the invention.

The monitoring device 1 according to the invention will now be described in a non-limitative manner, referring to FIG. 1.

The monitoring device 1 comprises a connector 2 to be connected to an end of a linear optical strand 40.

The optical strand 40 is used as a sensor, and consists in a component as described in document EP 0 264 622 B1, with optical waveguides fastened on or in the component under mechanical prestress, firmly bounded to the component over at least part of its length, and prestressed to such an extend that they are subjected to tensile stress even when subjected to little deformation.

The monitoring device 1 is arranged as a unit, i.e. as a compact assembly comprising an optical strand 40.

The monitoring device 1 also comprises:
- one optical source 3 adjacent to the optical strand 40, formed by a laser emitting in the infrared (between 780 nm et 1 000 000 nm), and emitting an optical emission signal 4 that will propagate in the optical strand 40;
- one optical analogue detector 5 adjacent to the optical strand 40, receiving an optical return signal 6.

The optical strand 40 makes a U-turn (see FIGS. 4A and 4B) for light to return towards the detector, near the optical source The monitoring device 1 can be arranged as a housing comprising in particular the optical source 3 and the optical analogue detector 5. The housing is adjacent to the optical strand 40.

The dimensions of said housing can be less than 100 mm (length)×40 mm (width)×10 mm (height).

The monitoring device comprises also processing means to control other parameters like the power of the optical source.

The optical return signal 6 corresponds to the optical emission signal 4 returning towards the monitoring device 1 after propagation in the optical strand 40.

The optical analogue detector 5 detects an intensity of the optical return signal 6 and compares it with the intensity of the optical emission signal 4. Therefore, a part (not represented) of the optical emission signal 4 is directed towards the optical analogue detector 5, whereas the major part of the optical emission signal 4 is directed towards the optical strand 40.

The optical analogue detector 5 can consist of a photodiode.

The optical source 3 is controlled by a processor 7 (control means) arranged to alternately activating and deactivating a light emission by said optical source 3.

Said activations and deactivations are automatic and controlled by processor 7.

Although not specified, the term "processor" includes the processor itself and the software, hardware (memory, etc.) needed for the processor to operate in the desired manner.

The processor 7 (like all the other processors listed in the following description), could be replaced with:
- a micro-processor (including the micro-processor itself and the software, hardware needed for the micro-processor to operate in the desired manner);
- a micro-controller (including the micro-controller itself and the software, hardware needed for the micro-controller to operate in the desired manner);
- any assembly of hardware and software arranged in the desired manner.

Emission of the optical emission signal 4 corresponds to a rectangular wave.

A ratio between the non-emission duration and the emission duration is greater than 5000. It makes it possible to reduce the total energy consumption of the monitoring device 1 according to the invention.

For instance, the optical source is activated 1 µs every 30 ms. Such an activation requires around 30 µA on average, whereas it would require 700 mA on average if the optical source were activated 1 ms every 30 ms. Average energy consumption increases more than linearly with the time duration of the optical source emission.

The optical source 3 is supplied by a battery 9 that is part of the monitoring device 1 according to the invention. Such a battery 9 is sufficient for powering the optical source 3 because the energy consumption of the optical source 3 is reduced as mentioned above. In a preferred embodiment, battery 9 is a non rechargeable battery. Indeed, the self-discharge of a non rechargeable battery is reduced compared with the self-discharge of a rechargeable battery. Using non rechargeable batteries makes it possible to extend the time period during which the monitoring device 1 can be self-reliant.

There is no wire between the optical source 3 and remote energy storage means with high capacity of energy storage. The invention allows savings of material and time associated with such wire. The monitoring device according to the invention can be self-powered up to 5 consecutive years. Therefore, it optimizes maintenance and offers a secure availability to the users of such a monitoring device 1.

The battery 9 is also used for powering the whole monitoring device 1, including in particular the optical analogue detector 5.

As the optical source 3, the optical detector 5 and the optical strand 40 form a compact unit, one can speak of an equipped with a mini-integrated device 1.

A second embodiment of the monitoring device 1 according to the invention will now be described in a non-limitative manner, referring to FIG. 2. Only the differences with respect to FIG. 1 will be described.

Figure 2:
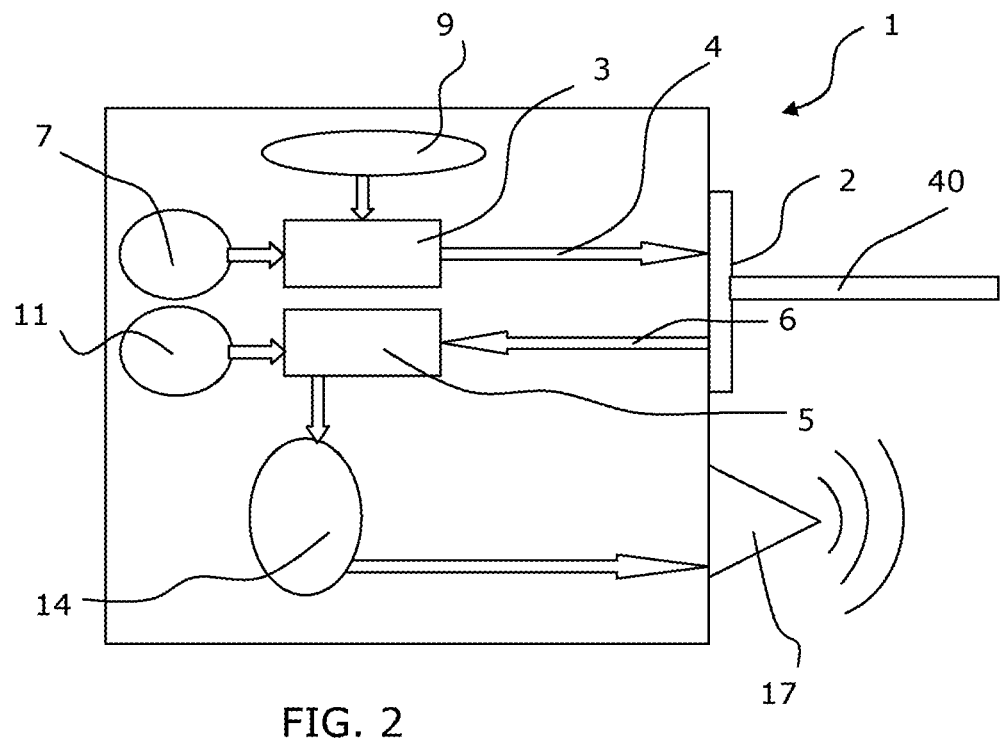
FIG. 2 is a second embodiment of a monitoring device according to the invention.

The monitoring device 1 of FIG. 2 comprises a processor 11 for alternately activating and deactivating the detection by the optical analogue detector 5.

Processor 11 for controlling the optical analogue detector 5 and processor 7 for controlling the optical source 3 can be one unique processor.

The time period during which the detection is activated corresponds to the time period during which an optical return signal 6 is received, to which is added delays due to the electronics in particular the electronics in the detector 5.

The monitoring device 1 of FIG. 2 comprises also a memory 14 receiving data from the optical analogue detector 5.

The monitoring device 1 of FIG. 2 comprises also a transceiver 17 for wireless transmission of data that can be the data detected by the optical analogue detector 5.

Different operating modes can be implemented that will be described in reference to the monitoring system according to the invention.

We will know compare the scanning frequency in the prior art and according to the invention.

Figure 3A:
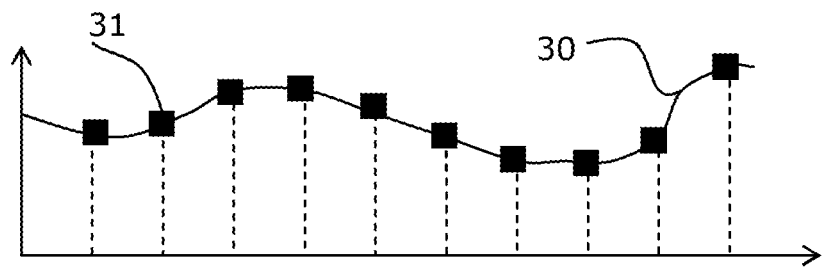
FIGS. 3A and 3B is are two graphics for comparison of scanning frequency in the prior art and according to the invention.
Figure 3B:
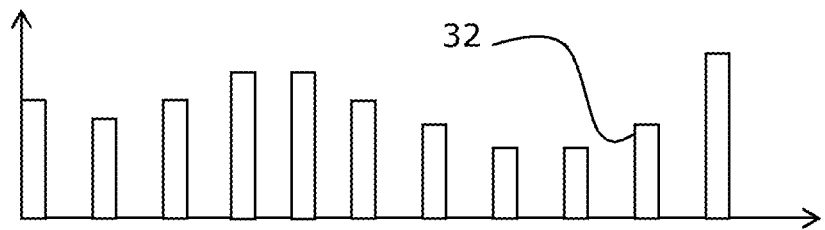

FIGS. 3A and 3B are graphics of the intensity of the detected optical return signal 6 as a function of time.

FIG. 3A corresponds to the detection according to the prior art: the optical emission signal 4 is continuously emitted. An optical return signal 6 is therefore a continuous signal 30, which is detected using a digital detection. Each square 31 corresponds to one measure using digital detection. A commonly used scanning frequency is for instance 100 Hz.

FIG. 3B corresponds to the detection according to the invention: the optical emission signal 4 is alternately emitted and non emitted. An optical return signal 6 is therefore a rectangular signal 32, which is detected using an analogue detection. The duration of light emission by the optical source 3 is for instance 1 microsecond per 10 milliseconds. For reasons of clarity of the figure, said ratio is not respected on the figures. The duration of light emission is divided at least by 10000. It corresponds to a scanning frequency of 100 Hz which means that the quality of the measure is the same although the energy consumption can by divided by 10000. The monitoring device 1 according to the invention makes it possible to realize a high frequency measure with an excellent energy balance.

A third embodiment of a monitoring device 1 according to the invention will now be described in a non-limitative manner, referring to FIG. 4A.

An optical strand 40 is fixed to a building structure to monitor (not represented on FIG. 4A) at two fixation zones:
- at one end 40', using the connection to the other elements of the monitoring device 1 according to the invention, the monitoring device 1 being itself fixed to the building structure;
- at the other end 40", using a support 42 that is fixed to the building structure.

Figure 4A:
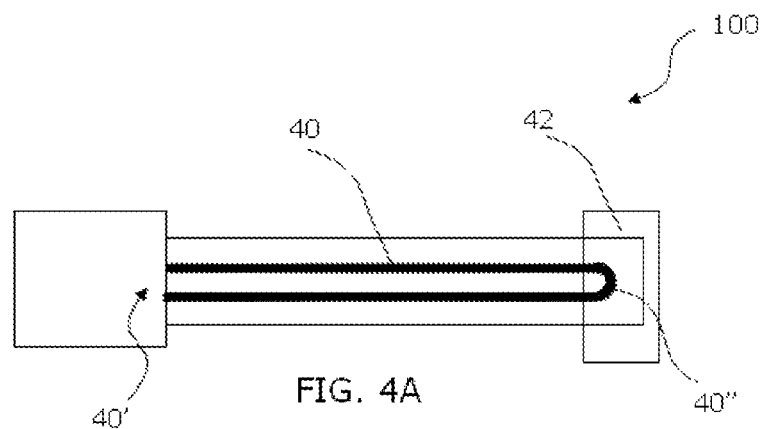
FIG. 4A is a third embodiment of a monitoring device according to the invention.

As can be seen on FIG. 4A, the optical strand 40 extends linearly. Ends 40' and 40" of the optical strand 40 refer to the end of the linear assembly formed by the optical strand 40.

A deformation of the building structure between the two fixation zones can thereby be detected and measured.

Figure 4B:
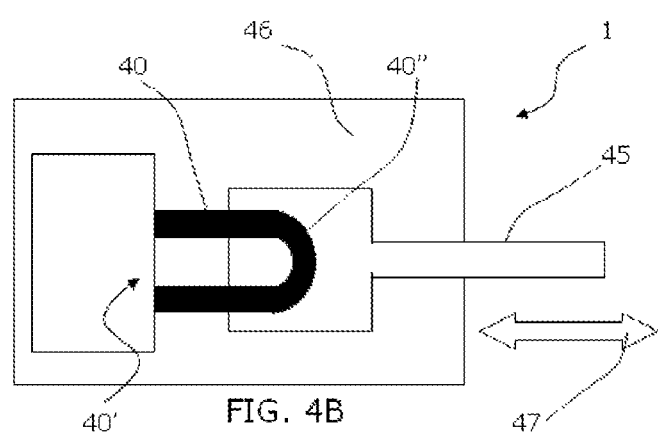
FIG. 4B is fourth embodiment of a monitoring device according to the invention.

A fourth embodiment of a monitoring device 1 according to the invention will now be described in a non-limitative manner, referring to FIG. 4B.

The optical strand 40 is connected to a building structure to monitor (not represented on FIG. 4B) using:
- at one end 40', using the connection to the other elements of the monitoring device 1 according to the invention, the monitoring device 1 being itself fixed to the building structure via support 46;
- at the other end 40", using a connection to a stylus 45 that can be fixed or not to another part of the building structure.

The stylus 45 can translate with respect to support 46 along an axis 47.

Figure 5:
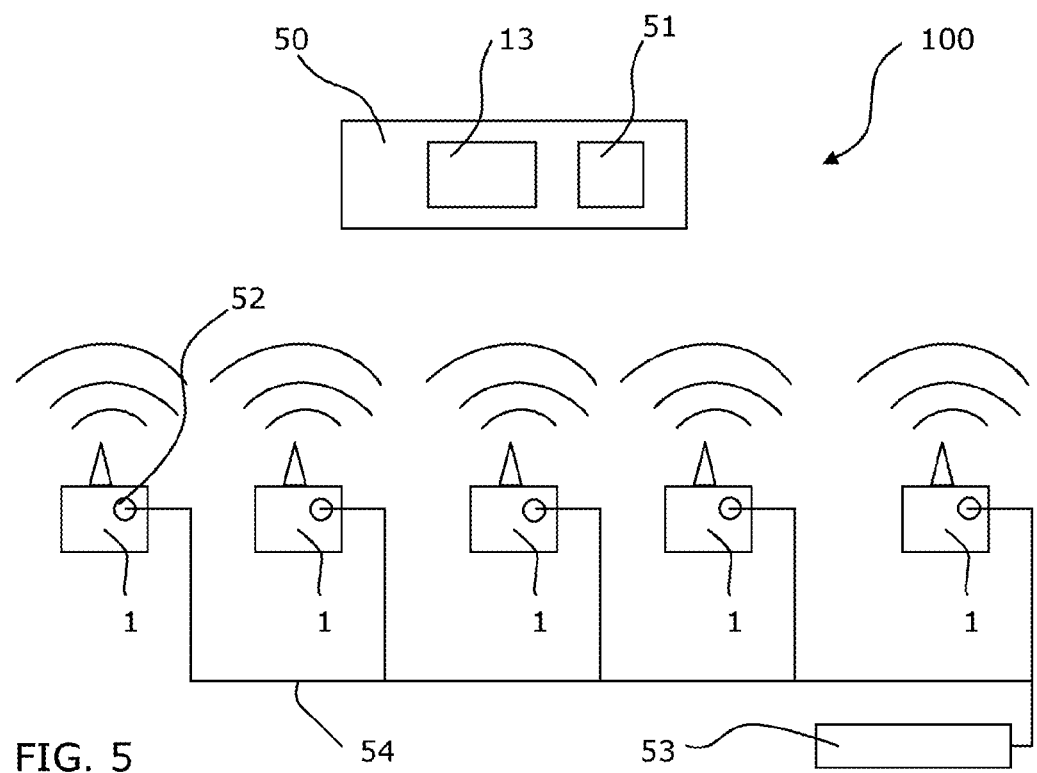
FIG. 5 is a first embodiment of a monitoring system according to the invention.

Said embodiment is described in details in document EP 0 649 000 B1, disclosing a measuring device for monitoring buildings, areas of land or the like,
- comprising an optical waveguide bending sensor, which has a multi-mode optical waveguide and is arranged in the form of a loop (the optical strand 40);
- having a plurality of sensor sections having the form of an arc, arranged between support plates, which are securely connected with respect to the sensor sections and to areas of buildings or land (support 46 and stylus 45); and comprising a light source (optical source 3) connected to the optical waveguide bending sensor and light receivers with evaluation means for light attenuation values (detector 5 and processing means 13, see description referring to FIG. 5 below).

The optical waveguide bending sensor can be arranged in the form of a plurality of loops.

The optical waveguide bending sensor can consist of gradient-index multi-mode optical waveguide sections and step-index multi-mode optical waveguide sections connected thereto, the sensor sections being formed by gradient-index multi-mode optical waveguides.

In particular, any deformation of the optical strand 40 can be guided by deflection means connected to the ends of the support plates which face each other.

A first embodiment of a monitoring system 100 according to the invention will now be described in a non-limitative manner, referring to FIG. 5.

FIG. 5 also illustrates other aspects of the monitoring device 1 according to invention.

In the monitoring system 100, at least one monitoring device 1 according to the invention is in wireless transmission with a unique remote station 50.

On FIG. 5, all the monitoring devices 1 according to the invention are in wireless transmission with the remote station 50.

The several monitoring devices 1 according to the invention can be installed on a same building structure to monitor.

The remote station 50 is used for collecting data from one or more building structure and calculating different parameters representing a mechanical state of said building structure. The remote station can also be used for controlling the operation of the monitoring device 1 according to the invention.

The remote station comprises a processor 13 for calculating a change in the length of the optical strand 40. By comparing the intensity of the optical emission signal 4 and of the optical return signal 6, the processor 13 can calculate the damping of the optical emission signal 4, and relate it to a change in the length of the light waveguide. The man skilled in the art knows such a calculation, in particular from EP 0 264 622 B1 mentioned in introduction.

In a variant of said embodiment, processor 13 could be arranged in the monitoring device 1.

Different operating modes of data exchange between the remote station and the monitoring device 1 according to the invention can be mentioned:
  an economic operating mode: the data transmission is activated only on demand, the demand being sent from the remote station 50 to the monitoring device 1 by a user (using an human machine interface 51);
  an automatic operating mode: the data transmission is periodically activated, the period being predetermined or controlled from the remote station 50 by a user.

The memory 14 makes it possible to store several data before sending them to a remote station 50. The transmitted data can refer to the last detection or to a whole time period (the last 24 hours for instance).

The different modes are more or less energy efficient and can be used depending on at least one parameter among:
  an energy storage capacity of the battery 9;
  a risk associated with the structure to monitor (depending on the age of the structure, its environment, its complexity, etc.).

The optical source 3 emission and non emission moments can follow each other with a predetermined period.

The optical source 3 emission and non emission moments can follow each other with a period controlled by a user from the remote station 50.

The monitoring devices 1 represented on FIG. 5 comprise an electrical connector 52, consisting in a bus CAN (Controller Area Network).

Such an electrical connector 52 can be used to quickly transfer data in the monitoring device 1, for instance to install a new software.

Such an electrical connector 52 can be used for powering a monitoring device 1.

Such electrical connectors 52 can be used to connect at least two monitoring devices 1 to the remote station 50 with only one single wire 54 arriving at the remote station 50.

Figure 6:
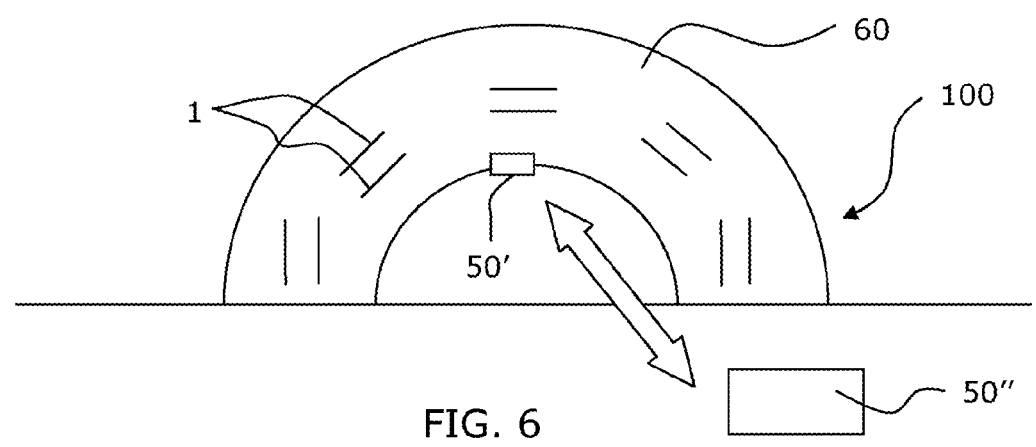
FIG. 6 illustrates a use of a monitoring system and device according to the invention.

FIG. 6 illustrates a use of a monitoring system 100 according to the invention. Several monitoring devices 1 according to the invention are secured to a bridge 60 that is monitored.

In the embodiment illustrated on FIG. 6, the remote station consists in:
  an intermediate station 50' that is in wireless communication with the monitoring devices 1;
  a central station 50" that is communication using internet with the intermediate station 50'.

The intermediate station 50' can consist in a simple transceiver acting as an interface with the central station 50", the central station 50" being able to receive data from several intermediate stations 50' (for instance corresponding each to a structure 60).

Of course, the invention is not limited to the examples which have just been described and numerous adjustments can be made to these examples without exceeding the scope of the invention.

In particular all the characteristics, forms, variants and embodiments described above are combined together in various combinations insofar they are not mutually exclusive and each other.

The invention claimed is:

1. A monitoring device used for the monitoring of an area of building or land by detecting monitoring data relating to an optical signal after a round trip in an optical strand, comprising:
  an optical strand used as a sensor, comprising optical waveguides under mechanical prestress to such an extent that they are subjected to tensile stress even when subjected to little deformation;
  one optical source for emitting an optical emission signal transmitted in the optical strand;
  one optical analogue detector for detecting an intensity of an optical return signal corresponding to the optical emission signal returning from the optical strand, said optical analogue detector configured to calculate monitoring data solely from said intensity of the optical return signal; and
  the monitoring device arranged as a compact unit and comprising control means for alternately activating and deactivating the emission of the optical source so that a ratio between the non-emission duration and the emission duration is greater than 5000;
  the optical strand consisting in a component with optical waveguides that monitor the deformations of the component and are fastened on or in the component under mechanical prestress, the optical waveguides being firmly bounded to the component over at least part of its length and being prestressed to such an extent that the optical waveguides are subjected to tensile stress when deformations due to compression, shrinkage or creep occur in the component.

2. The monitoring device of claim 1, wherein said control means for alternately activating and deactivating the emission of the optical source are arranged to periodically activate the emission of the optical source one microsecond per time period, said time period being between 5 and 100 milliseconds.

3. The monitoring device of claim 1, wherein said control means for alternately activating and deactivating the emission of the optical source are arranged to periodically activate the emission of optical source one microsecond per time period, said time period being between 5 and 30 milliseconds.

4. The monitoring device of claim 1, further comprising an electrical connector for transferring data and/or energy.

5. The monitoring device of claim 1, further comprising wireless transmission means for transmitting monitoring data to a remote station.

6. A monitoring system comprising a monitoring device and a remote station, the monitoring device being used for monitoring an area of a building or land by detecting monitoring data relating to an optical signal after a round trip in an optical strand and comprising:
- an optical strand used as a sensor, comprising optical waveguides under mechanical prestress to such an extent that they are subjected to tensile stress even when subjected to little deformation;
- one optical source for emitting an optical emission signal transmitted in the optical strand;
- one optical analogue detector for detecting an intensity of an optical return signal corresponding to the optical emission signal returning from the optical strand;
- wireless transmission means for transmitting said intensity of the optical return signal to said remote station;
- the monitoring device being arranged as a compact unit and comprising control means for alternately activating and deactivating the emission of the optical source so that a ratio between the non-emission duration and the emission duration is greater than 5000;
- the optical strand consisting in a component with optical waveguides that monitor the deformations of the component and are fastened on or in the component under mechanical prestress, the optical waveguides being firmly bounded to the component over at least part of its length and being prestressed to such an extent that the optical waveguides are subjected to tensile stress when deformations due to compression, shrinkage or creep occur in the component;
- the remote station comprising processing means for calculating, solely from an intensity variation of the optical return signal, monitoring data comprising a change in the length of the optical strand.

7. The monitoring system of claim 6, comprising several monitoring devices, each comprising wireless transmission means for transmitting intensities of optical return signals to a same remote station.

8. The monitoring system of claim 6, wherein the remote station comprises means for a user to activate said transmission of intensity of the optical return signal.

9. A method of monitoring an area of building or land carried out in a monitoring device according to claim 1, comprising:
- alternately activating and deactivating the emission of the optical source, so that a ratio between the non-emission duration and the emission duration is greater than 5000; and
- calculating monitoring data based solely on an intensity of an optical return signal corresponding to the optical emission signal returning from the optical strand.

10. The method of claim 9, further comprising a step of transmitting the intensity of the optical return signal from the monitoring device to a remote station.

11. The method of claim 10, wherein said transmission step is periodically carried out.

12. The method of claim 10, wherein said transmission step is carried out on demand.

13. The method of claim 11, wherein said transmission step may also be carried out on demand.

\* \* \* \* \*